United States Patent
Abe et al.

(10) Patent No.: US 7,469,014 B2
(45) Date of Patent: Dec. 23, 2008

(54) REDUCED BITSTREAM CANDIDATE BASED RECEIVER AND RECEIVED SIGNAL PROCESSING METHOD

(75) Inventors: Tetsushi Abe, Yokohama (JP); Hiromasa Fujii, Yokosuka (JP); Hitoshi Yoshino, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 724 days.

(21) Appl. No.: 11/166,384

(22) Filed: Jun. 27, 2005

(65) Prior Publication Data

US 2005/0286659 A1 Dec. 29, 2005

(30) Foreign Application Priority Data

Jun. 28, 2004 (JP) .............................. 2004-190014
Feb. 2, 2005 (JP) .............................. 2005-026403

(51) Int. Cl.
H04L 5/12 (2006.01)
(52) U.S. Cl. ........................ 375/262; 375/267; 375/341; 375/347; 455/67.11; 455/226.1; 370/465; 714/760; 714/774; 714/780
(58) Field of Classification Search ................. 375/262, 375/265, 267, 340, 341, 347, 349; 455/501, 455/504, 506, 63.1, 65, 67.11, 131–135, 455/226.1–226.3, 303; 370/464, 465, 487; 714/760, 774, 780
See application file for complete search history.

(56) References Cited

U.S. PATENT DOCUMENTS 6,327,316 B1 * 12/2001 Ikeda ........................ 375/341
7,200,103 B2 * 4/2007 Chan et al. ................ 370/204
7,236,536 B2 * 6/2007 Hochwald et al. ........... 375/265
7,369,610 B2 * 5/2008 Xu et al. ................ 375/240.08

OTHER PUBLICATIONS

Bertrand M. Hochwald, et al., "Achieving Near-Capacity on a Multiple-Antenna Channel", IEEE Transactions on Communications, vol. 51, No. 3, Mar. 2003, pp. 389-399.
Hiroyuki Kawai, et al., "Complexity-reduced Maximum Likelihood Detection Based on Replica Candidate Selection with QR Decomposition Using Pilot-Assisted Channel Estimation and Ranking for MIMO Multiplexing Using OFCDM", IEICE Technical Report. RCS, Mar. 2004, pp. 55-60, (with English Abstract).
Hiroyuki Kawai, et al., "Independent Adaptive Control of Surviving Symbol Replica Candidates at Each Stage Based on Minimum Branch Metric in QRM-MLD for OFCDM MIMO Multiplexing", IEEE 2004, 7 Pages.

* cited by examiner

*Primary Examiner*—Dac V Ha
(74) *Attorney, Agent, or Firm*—Oblon, Spivak, McClelland, Maier & Neustadt, P.C.

(57) ABSTRACT

A receiver comprises multiple receiving antennas configured to receive bitstreams transmitted from multiple transmission antennas; a bitstream candidate estimator configured to estimate a prescribed number of bitstream candidates among possible combinations of the received bitstreams and to calculate reliability information for each of the candidates; a bit-based estimator configured to produce a bit-based estimation result for each bit of the transmitted bitstreams based on the estimated candidates and the associated reliability information, the bit-based estimation result being adjusted by an adjusting criterion determined by the reliability information; and a decoder configured to decode the transmitted bitstreams based on the adjusted bit-based estimation result.

20 Claims, 15 Drawing Sheets

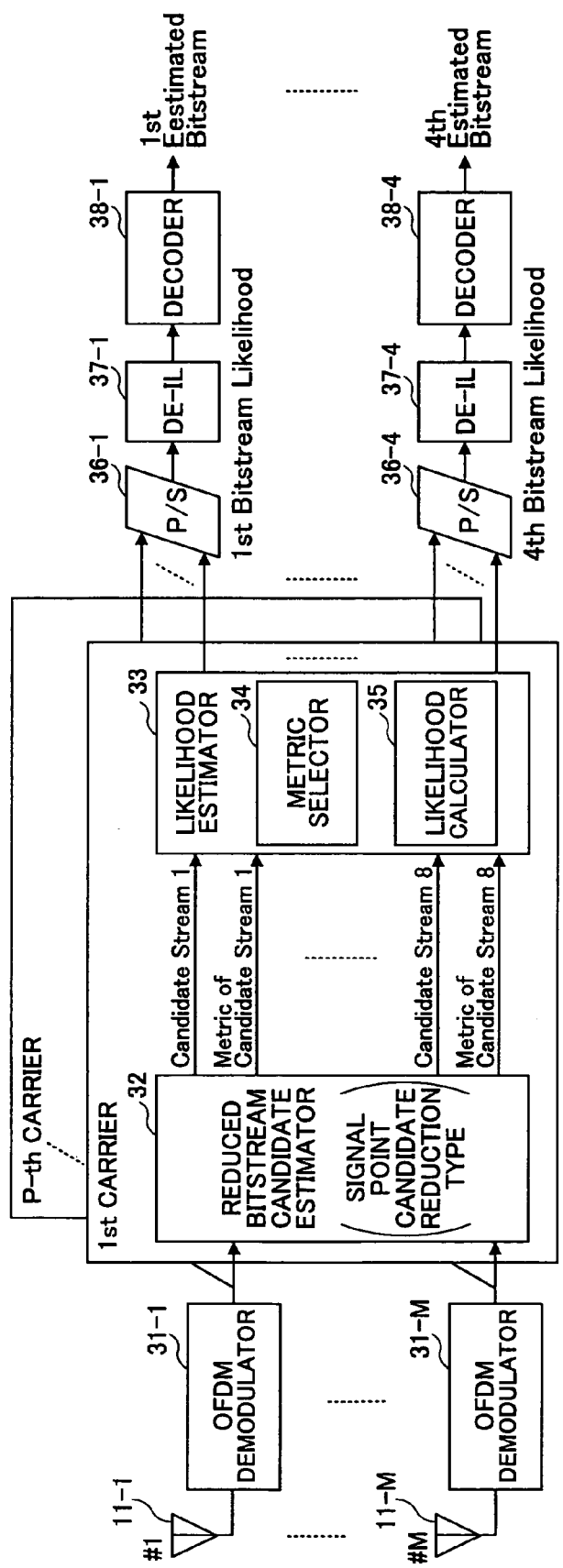

-◇- PROPOSED (Z=16)
-◆- CONVENTIONAL (Z=16)
-○- PROPOSED (Z=8)
-●- CONVENTIONAL (Z=8)
-△- PROPOSED (Z=4)
-▲- CONVENTIONAL (Z=4)

REDUCED BITSTREAM CANDIDATE BASED RECEIVER AND RECEIVED SIGNAL PROCESSING METHOD

FIELD OF THE INVENTION

The present invention generally relates to a multi-input multi-output (MIMO) receiver used for high-rate wireless transmission, and more particularly, to a reduced bitstream candidate based receiver configured to narrow and screen the bitstream candidates of a transmitted signal to estimate likelihood of each bit based on the screened bitstream candidates.

BACKGROUND OF THE INVENITON

In recent years and continuing, techniques for realizing high-rate and high-quality wireless transmission have been discussed. Such techniques include error correction coding, multi-level modulation (such as 16 QAM or 64 QAM), and space division multiplex transmission using multiple transmission antennas.

FIG. 1A and FIG. 1B are schematic block diagrams of a transmitter with multiple transmission antennas and functions of error correction and multi-level modulation. In the example shown in FIG. 1A, the transmission bitstream is encoded by the coder 110, and the code stream is divided into multiple pieces by the serial-to-parallel (S/P) converter 111 according to the number of transmission antennas. Each of the divided pieces is supplied to one of the modulators 112-1 through 112-N and is subjected to QAM multi-level modulation. Then the modulated pieces are space-division-multiplexed and transmitted from transmission antennas 101-1 through 101-N. The multiple signals transmitted from N antennas are received by M antennas (201-1 through 201-M) at the receiving end, and received signals r1-rM are extracted. The S/P converted bit "$c_{n,k}$" at the transmission end denotes the k-th code bit for the n-th antenna.

FIG. 1B is a more specific example of the structure shown in FIG. 1A, and illustrates a transmitter using four transmission antennas, convolutional coding rate of ½, and QAM modulation. The 4-bit information is input to the half-rate coder 111, and converted into an 8-bit stream, which stream is then divided into four 2-bit data items. The 2-bit data items are subjected to multi-level modulation in the associated 4QAM modulators 112-1 through 112-4, and transmitted from the transmission antennas 101-1 through 101-4 in a space division multiplexing manner. It should be noted that only one symbol-duration data flow is depicted in the examples of FIG. 1A and FIG. 1B.

In data transmission using multiple antennas illustrated in FIG. 1A and FIG. 1B, the vector "r" of the received signal is expressed by Equation (1), using channel matrix H, transmission symbol vector "s", and noise vector "n", $$r = \begin{bmatrix} r_1 \\ \vdots \\ r_M \end{bmatrix} \quad (1)$$

$$= \begin{bmatrix} h_{11} & \cdots & h_{1N} \\ \vdots & \ddots & \vdots \\ h_{M1} & \cdots & h_{MN} \end{bmatrix} \cdot \begin{bmatrix} s_1 \\ \vdots \\ s_N \end{bmatrix} + \begin{bmatrix} n_1 \\ \vdots \\ n_M \end{bmatrix}$$

$$\equiv H \cdot s + n$$

where index M denotes the number of receiving antennas, and N denotes the number of transmission antennas. The variance of noise $n_m$ is represented by $\sigma^2$. Entry $h_{mn}$ of the matrix indicates the channel between the n-th transmission antenna and the m-th receiving antenna.

A known receiver structure for processing the received signal "r" to decode the transmitted bitstream is a Max-LOG-MAP (Maximum A posteriori Probability) receiver. With this structure, metrics ($-\|r-H\cdot s\|^2$) of all the transmitted bit patterns are calculated, and logarithmic likelihood (hereinafter, referred to simply as "likelihood") $L_{n,k}$ of transmitted code bit $c_{n,k}$ is determined from Equation (2), using the calculated metric values.

$$L_{n,k} = \max_{S\;s.t.c_{n,k}=1} \{-\|r - H \cdot s\|^2\} - \max_{S\;s.t.c_{n,k}=0} \{-\|r - H \cdot s\|^2\} \quad (2)$$

The subscript "S s.t.$c_{n,k}$=1" shown in the first term of the right-hand-side of Equation (2) represents a set of symbol sequence candidates having a bit $c_{n,k}$=1 among the whole set S of all possible symbol sequence candidates. The first term of the right-hand-side of Equation (2) represents the maximum metric in the symbol sequence candidates having a bit $c_{n,k}$=1. The subscript "S s.t.$c_{n,k}$=0" shown in the second term of the right-hand-side of Equation (2) represents a set of symbol sequence candidates having a bit $c_{n,k}$=0 among the whole set S of all possible symbol sequence candidates. The second term of the right-hand-side of Equation (2) represents the maximum metric in the symbol sequence candidates having a bit $c_{n,k}$=0.

The determined likelihood of the code bitstream is input to a decoder and decoded. For the likelihood estimation, all the bitstream candidates have to be calculated. As the number of levels of multi-level modulation or the number of transmission antennas increases, its computational amount increases exponentially. To avoid this problem, it is proposed to perform pre-processing prior to likelihood estimation. For example, a receiver using a reduced number of bitstream candidates is proposed, which receiver is designed so as to reduce the processing workload by narrowing the bitstream candidates to a certain extent in advance and estimating likelihood for the metrics of the narrowed candidates. See, for example, (1) Bertrand M. Hochwald, et. al., "Achieving Near-Capacity on a Multiple-Antenna Channel", IEEE Transactions on Communication, Vol. 51, No. 3 March 2003; and (2) H. Kawai, et al., "Complexity-reduced Maximum Likelihood Detection Based on Replica Candidate Selection with QR decomposition Using Pilot-Assisted Channel Estimation and Ranking for MIMO Multiplexing Using OFCDM", IEICE Technical Report. RCS, March 2004, pp. 55-60.

FIG. 2 is a schematic diagram illustrating the basic structure of a conventional receiver based on a reduced number of bitstream candidates. At the transmission end, an input bit stream is encoded by coder 110, and divided pieces of the coded bitstream are modulated by modulator 112 and transmitted from transmission antennas 101-1 through 101-N. Signals received at multiple receiving antennas 201-1 through 201-M are supplied to a reduced bitstream candidate estimator 202. If n-bit information is generated, prior to division of the bitstream (e.g., n/M bits per transmission antenna), at the transmission end, then the reduced bitstream candidate estimator 202 selects only Z bitstream candidates, which are likely to have high reliability, among $2^n$ bit patterns and calculates metrics for the selected candidates. The selected bitstream candidates and the associated metrics are supplied to a bit-based likelihood estimator 203, which estimates likelihood for each bit based on Equation (2). The likelihood of each bit is supplied to the soft-input decoder 210 and decoding is performed using the likelihood.

FIG. 3 illustrates the likelihood estimation technique disclosed in the above-described publication (1). In this example, an 8-bit code sequence is to be decoded. The reduced bitstream candidate estimator 202 estimates four patterns as bitstream candidates among 256 (which equals $2^8$) bit patterns, and calculates the metric (which equals $(-\|r-H \cdot s\|^2)$ for each of the selected candidates. Metrics of candidate 1, 2, 3, and 4 are −5, −6, −30, and −100, respectively. At this point of time, the bitstream candidates are reduced down to 1/64 of the possible bitpatterns. As the bitstream candidate reducing technique, publication (1) uses a sphere decoding technique, and publication (2) uses M algorithm (deterministic algorithm).

The bit-based likelihood estimator 205 includes a likelihood calculation unit 206 and a likelihood clipping unit 207. The likelihood calculation unit 206 calculates a log likelihood ratio (LLR, which is also referred to simply as "likelihood") of each bit of the bitstream from Equation (2), based on the four bitstream candidates 1-4 and the associated metrics. For the first bit, all the four bitstream candidates take "1", and accordingly, the first term of the right-hand-side of Equation (2), which represents the maximum metric corresponding to "1", becomes −5. The second term of the right-hand-side of Equation (2) represents the maximum metric for "0"; however, there is no candidate in the selected ones that has "0" at the first bit and no metric is found. Therefore, a predetermined fixed value is used as a substitute for the second term metric. In this example, fixed value X is set to −1000 (X=−1000). The reason for choosing a very small value (such as −1000) as the fixed value X is based on inference that there is little possibility that "0" has been transmitted because there is no metric corresponding to "0". If the probability of "0" transmission is high, the metric will take a greater value, but is not beyond zero. By using the fixed value X, the likelihood LLR of the first bit becomes −5−(−1000)=995. Similarly, likelihood is calculated for each of the second through the eighth bits.

The likelihood clipping unit 207 clips a likelihood whose absolute value exceeds a prescribed value down to a prescribed clipping value. For example, the clipping value is set to 30 in advance (C=30), and if the absolute value of the calculated likelihood exceeds the clipping value, that likelihood is clipped to 30. The likelihood values having been subjected to the clipping operation are input to the soft-input decoder 210, and a transmitted bitstream is decoded. The significance of the clipping operation for restricting the absolute value of likelihood is as follows. If the calculated likelihood takes a large value, such as 995, as compared with other likelihood values, this strongly suggests that +1 has been transmitted. However, if −1 has actually been transmitted, 995 becomes a huge error which will adversely affect the subsequent decoding characteristic. This problem does not exist in likelihood estimation using all bitstream candidates, such as a MAX-LOG-MAP method; however, it may happen when a reduced bitstream candidate based receiver is used.

In this manner, with the conventional bitstream-candidate reducing scheme, the bit-based likelihood estimator 205 produces likelihood of each bit, using the reduced number of bit patterns and the associated metrics estimated by the reduced bitstream candidate estimator 202. Among the selected bit patterns, those with relatively large metrics (such as candidates 1 and 2 in FIG. 3) are reliable, but those with small metrics (such as candidate 4) are deemed to be less reliable because reduced bitstream candidate estimator 20 may operate erroneously and output less reliable candidates.

If likelihood is calculated using metrics of less reliable bit patterns, accuracy of likelihood estimation is degraded, and advantages of the subsequent soft-input decoder can be not sufficiently pulled out.

SUMMARY OF THE INVENTION

Therefore, it is an object of the present invention to provide a reduced bitstream candidate based receiver and a received signal processing method that can improve accuracy of likelihood estimation, while reducing the workload of received signal processing, to realize a highly reliable signal reception characteristic.

To achieve the object, in one aspect of the invention, a receiver includes:

(a) a plurality of receiving antennas configured to receive bitstreams transmitted from multiple transmission antennas;

(b) a bitstream candidate estimator configured to estimate a prescribed number of bitstream candidates among possible combinations of the received bitstreams and calculate reliability information for each of the candidates;

(c) a bit-based estimator configured to produce a bit-based estimation result for each bit of a transmitted bitstream based on the estimated candidates and the associated reliability information, the bit-based estimation result being adjusted by an adjusting criterion determined by the reliability information; and (d) a decoder configured to decode the transmitted bitstream based on the adjusted bit-based estimation result.

In another aspect of the invention, a signal processing method carried out at a receiving end is provided. The method includes the steps of:

(a) receiving a plurality of bitstreams transmitted from multiple transmission antennas;

(b) estimating a prescribed number of bitstream candidates among all possible combinations of the received bitstreams;

(c) calculating reliability information for each of the estimated candidates;

(d) producing a bit-based estimation result made for each bit of a transmitted stream from the estimated candidates and the reliability information, based on a prescribed adjusting criterion determined by the reliability information; and (e) decoding the transmitted bitstream based on the adjusted bit-based estimation result.

With the above-described structure and/or method, the signal reception characteristic is improved with reliable signal decoding, while reducing workload on received signal processing.

BRIEF DESCRIPTION OF THE DRAWINGS

Other objects, features, and advantages of the invention will become more apparent from the following detailed description when read in conjunction with the accompanying drawings, in which

FIG. 6 illustrates an application of the present invention to an OFDM scheme, wherein FIG. 6A is a schematic block diagram of an OFDM transmitter and FIG. 6B is a schematic diagram of a reduced bitstream candidate based receiver applied to OFDM;

DETAILED DESCRIPTION OF THE PREFERRED EMBODIMENT

Figure 1A:
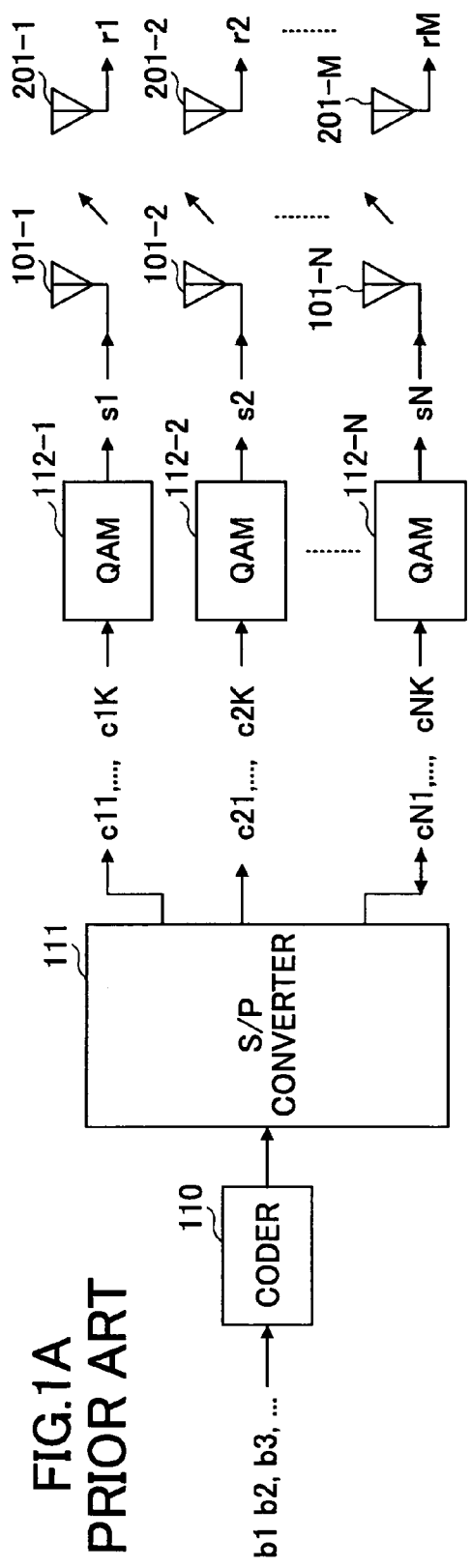
FIG. 1A and FIG. 1B illustrate examples of high-rate wireless transmission using error correction, multi-level modulation, and multiple transmission antennas.
Figure 1B:
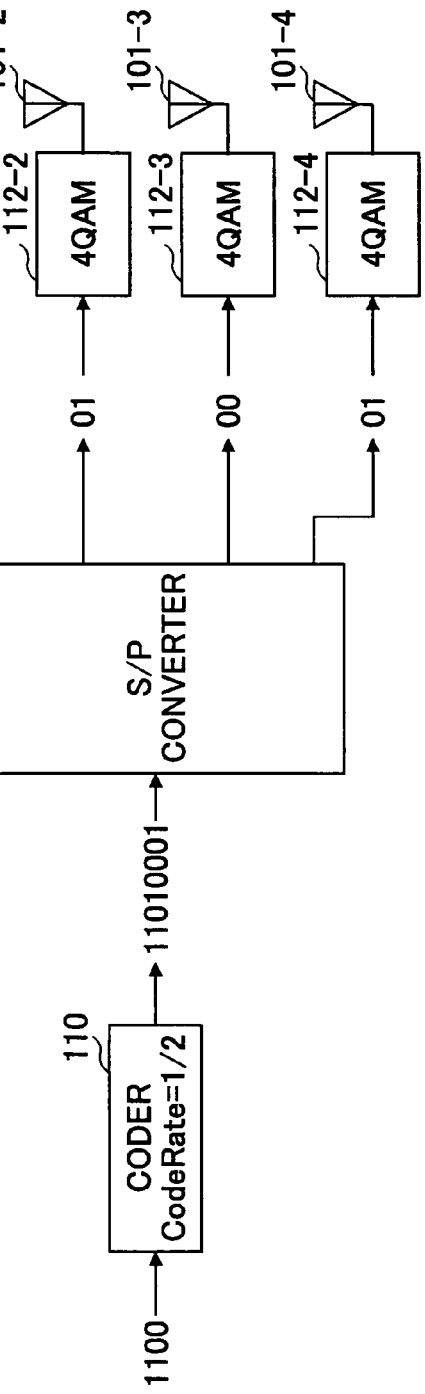
Figure 2:
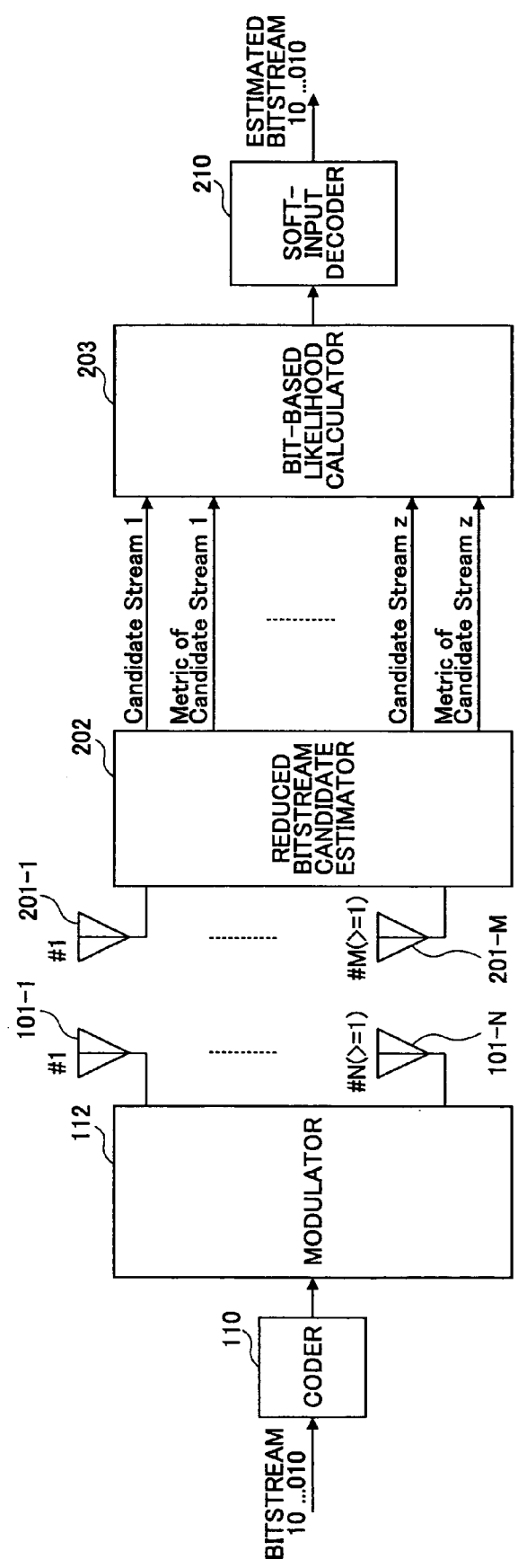
FIG. 2 is a schematic block diagram illustrating a known structure of a reduced bitstream candidate based receiver.

The basic structure of the invention is that a set of bitstream candidates already narrowed by a reduced bitstream candidate estimator are further screened to select only those bit patterns having high reliability represented by metric values. As the screening criterion, a metric value representing reliability information is used, and those bit patterns with metrics over a prescribed threshold are chosen for the subsequent likelihood estimation. The threshold for selecting the metrics may also be used as a fixed substitute value used when there is no metric corresponding to bit "0" or bit "1" in the subsequent likelihood estimation.

By employing this structure, only reliable bitstream candidates are selected from a reduced number of bitstream candidates, and likelihood is calculated based on the selected bitstream candidates and the associated reliability information. Consequently, the signal receiving characteristic is improved.

A selector uses a threshold C to select bitstream candidates whose metrics (reliability information) exceed the prescribed criterion. Threshold C may be defined using prescribed coefficient A and variance $\sigma^2$ of a noise component so as to be expressed as $C = -A*\sigma^2$. The variance of noise introduced in the signal in the wireless channel can be appropriately estimated at the receiving end. By setting a threshold C based on an appropriate noise estimate, more probable bitstream candidates can be selected. The coefficient A may be determined based on at least one of the number of selected bitstream candidates, the channel environment, and modulation scheme.

If the true symbol vector "s" of a transmitted signal is known, the corresponding metric is expressed as $$-\|r - H \cdot s\|^2 = -\|H \cdot s + n - H \cdot s\|^2 = -\|n\|^2. \quad (3)$$

It is understood that only the noise component remains. The resultant $-\|n\|^2$ becomes a random value with variance $2M*\sigma^2$. Accordingly, even if the receiving end does not know the true symbol vector s, the information that the metric corresponding to this true symbol vector becomes a random value $-\|n\|^2$ can be known in advance.

The present invention makes use of this feature, and takes into account the statistic feature of $-\|n\|^2$ to exclude those candidate patterns having an unrealistic metric (with very small probabilities) from the bitstream candidates selected by M algorithm.

A conventional bitstream candidate reducing method (such as M algorithm) simply estimates a prescribed reduced number of candidates among all possible combinations of bitstreams. Such a conventional technique is different from one using a specific quantity to cut off unsuitable candidates. In an embodiment of the present invention, the narrowed bitstream candidates are further screened using a nose variance to improve the reliability in likelihood estimation, and the signal reception characteristic can be improved as a result. Using a threshold to further narrow the candidates prior to likelihood estimation can reduce the computational amount, and improve estimation efficiency. When using another definition of the metric expressed as $-\|r - H \cdot s\|^2 / \sigma^2$, the threshold C does not require noise variance $\sigma^2$ because it is already incorporated in the metric.

Figure 4:
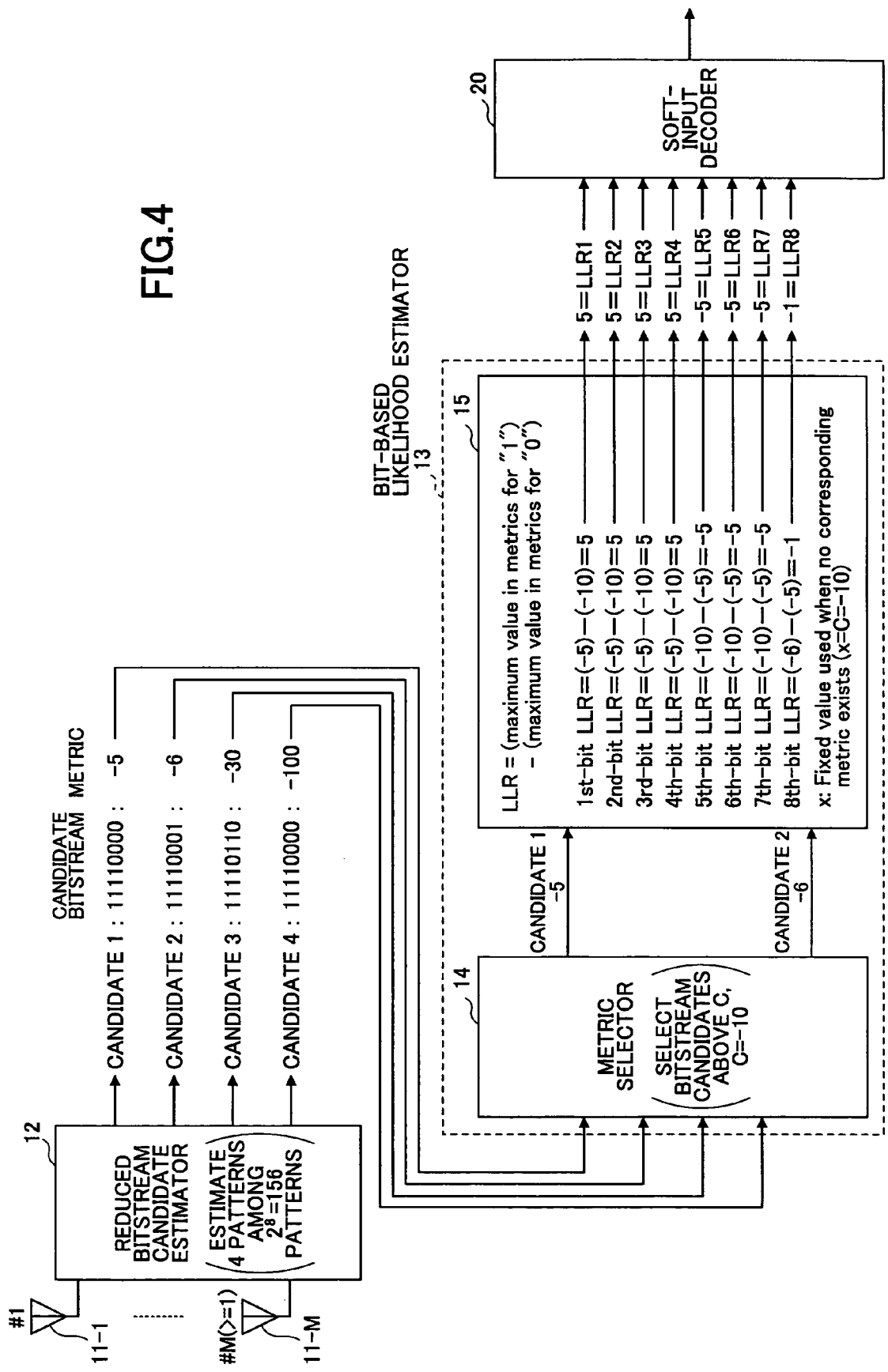
FIG. 4 is a schematic diagram illustrating the structure of a reduced bitstream candidate based receiver and bit-based likelihood estimation according to an embodiment of the invention.

FIG. 4 is a schematic block diagram illustrating the major part of a reduced bitstream candidate based receiver according to an embodiment of the invention. This figure also illustrates likelihood estimation of an embodiment. The receiver receives at receiving antennas 11-1 through 11-M multiple signals transmitted from multiple transmission antennas. A reduced bitstream candidate estimator 12 combines the received bitstreams to estimate a prescribed reduced number of candidates of the transmitted bitstream, and outputs metric $-\|r - H \cdot s\|^2$ of each of the bitstream candidates. A bit-based likelihood estimator 13 estimates likelihood of each bit based on the further reduced number of bitstream candidates and the associated metrics. A soft-input decoder 20 decodes the transmitted bitstreams based on the likelihood of each bit.

The bit-based likelihood estimator 13 includes a metric selector 14 and a likelihood calculator 15. The metric selector 14 selects only those bitstream candidates whose reliability levels satisfy a predetermined condition from the reduced number of bitstream candidates supplied from the reduced bitstream candidate estimator 12. The likelihood calculator 15 calculates likelihood of each bit based on the selected bitstream candidates and the associated metric, using equation (2).

$$L_{n,k} = \max_{S\ s.t. c_{n,k}=1} \{-\|r - H \cdot s\|^2\} - \max_{S\ s.t. c_{n,k}=0} \{-\|r - H \cdot s\|^2\} \quad (2)$$

In the example shown in FIG. 4, four patterns are estimated by the reduced bitstream candidate estimator 12 among $2^8 = 256$ bit patterns with respect to a transmitted 8-bit stream. Estimation of the reduced number of bitstream candidates is performed using a known technique, such as sphere detector or M algorithm. The reduced bitstream candidate estimator 12 also calculates a metric for each of the four candidates. The metrics of candidates 1, 2, 3 and 4 are −5, −6, −30 and −100, respectively.

The metric selector 14 receives the bitstream candidates, together with the associated metrics, and selects only those candidates having metrics over threshold C. In FIG. 4, threshold C is set to −10, and bit patterns of candidates 1 and 2 with metrics over −10 are selected. An important note here is that the candidates 3 and 4 are discarded because their metric values, respectively −30 and −100, are too small to be reliable considering the statistical property of $-\|n\|^2$.

Threshold C may be defined as $$C = -A * \sigma^2, A > 1 \quad (3)$$

where $\sigma^2$ is variance of noise power level, which may be acquired by estimation using monitoring or pilot signals. By appropriately setting coefficient A (in the range, for example, from 10 to 100) depending on channel environment or the modulation scheme, only highly reliable bitstream candidates can be selected from the outputs of the reduced bitstream candidate estimator 12. The definition of C is not limited to Equation (3), and other definitions may be employed. When using Equation (3), the threshold C is determined according to coefficient A and noise variance; however, a prescribed C value plotted in advance according to the wireless communication environment, other than noise, may be used.

The likelihood calculator 15 calculates the likelihood of each bit of the stream using bitstream candidates 1 and 2 and the associated metrics selected by the metric selector 14. For the first bit, the first term (the maximum metric for "1") of LLR becomes −5. Since both candidates 1 and 2 have bit "1" at the first bit, there is no value for the second term (the maximum metric for "0"). Accordingly, the threshold C used in metric screening (or selection) is again used as the fixed value x to be input to the second term. In the example shown in FIG. 4, C is set to −10 (C=−10), and therefore, −10 is inserted into the second term. In a similar manner, likelihood is calculated for the second through the eighth bits. The set of likelihood estimates calculated bit by bit is supplied to the soft-input decoder 20, and the transmitted bitstream is decoded based on the likelihood estimates. With this arrangement, only reliable metrics are selected from the already narrowed bitstream candidates prior to likelihood estimation, and therefore, the signal reception characteristic and reliability are improved, while reducing the amount of arithmetic operations.

Figure 5:
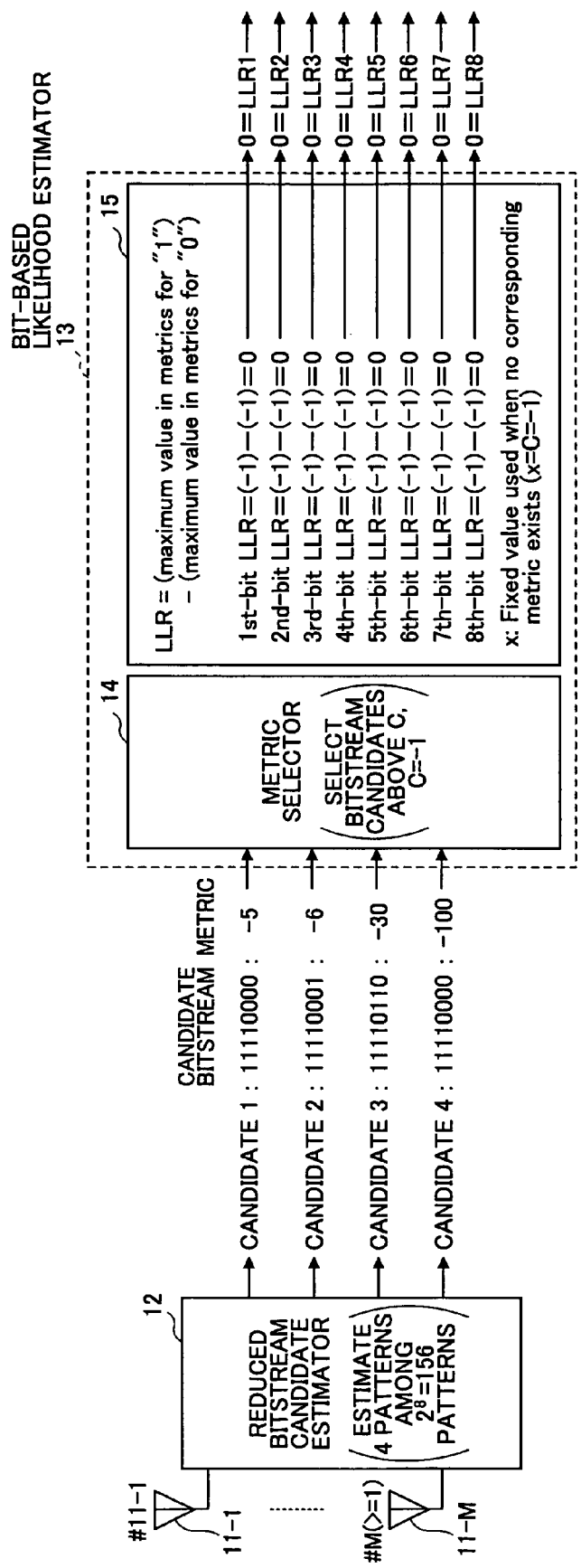
FIG. 5 is a schematic diagram illustrating another example of the reduced bitstream candidate based receiver, in which the threshold "C" used for metric selection performed prior to likelihood estimation is set to another value.

FIG. 5 illustrates another example of likelihood estimation in which threshold C used for metric selection is set to another value. In this example, C is set to −1 (C=−1), and there is no metric exceeding this C value. The metric selector 14 does not select any bit patterns. As has been described, the threshold value C is inserted as the fixed value x in the LLR equation when there is no appropriate metric. Accordingly, −1 is inserted in the first and second terms of LLR for all the bits, and likelihood of zero comes out for all the bits.

This means that bit determination is not performed when there is no metric exceeding the threshold (that is, when reliability is very poor). Although only 1 symbol section is illustrated in FIG. 4 and FIG. 5, bit-based likelihood estimation is performed for each of multiple symbol sections included in a transmission frame. Even if likelihood of "0" is output in a certain symbol section as illustrated in FIG. 5, quite accurate likelihood is calculated based on reliable metrics in the previous and subsequent symbol sections, as illustrated in FIG. 4. Accordingly, there is little adverse influence on the decoding accuracy. Rather, a more appropriate bitstream is decoded by removing less reliable likelihood estimates (as shown in FIG. 5). In this context, a transmission frame is a decoding block.

In a practical sense, there are few occasions where zero outputs of likelihood estimates continue over many symbol sections in a transmission frame as long as threshold C is appropriately selected. However, continuous zero outputs of likelihood estimates may occur in a transmission frame due to error in threshold determination or abrupt change in wireless channels. In such a case, it may become difficult for the soft-input decoder to accurately decode the transmitted bitstreams.

To avoid such a situation, if zero outputs of likelihood estimates continue over certain sections, the first candidate of the set of bitstream candidates estimated by the reduced bitstream candidate estimator 12 is used to perform likelihood calculation. For example, candidate 1 is "11110000" in FIG. 5. This bitstream is converted to a sequence of +1 and −1 to produce "1 1 1 1 −1 −1 −1 −1", which sequence is then multiplied by a weighting coefficient Q (Q>0) to produce "QQQQ−Q−Q−Q−Q". This sequence is substituted for the zero likelihood with all the bits zero.

It is desired to set the coefficient Q so as to be smaller than the other likelihood values. For example, the Q value may be determined by multiplying the average or the minimum of the likelihood estimates produced in other symbol sections by 0.1 or 0.01. With this arrangement, even if zero outputs of likelihood estimates continue over several sections in a transmission frame, the transmitted bitstream can be correctly decoded using the likelihood obtained from candidate 1.

Figure 8:
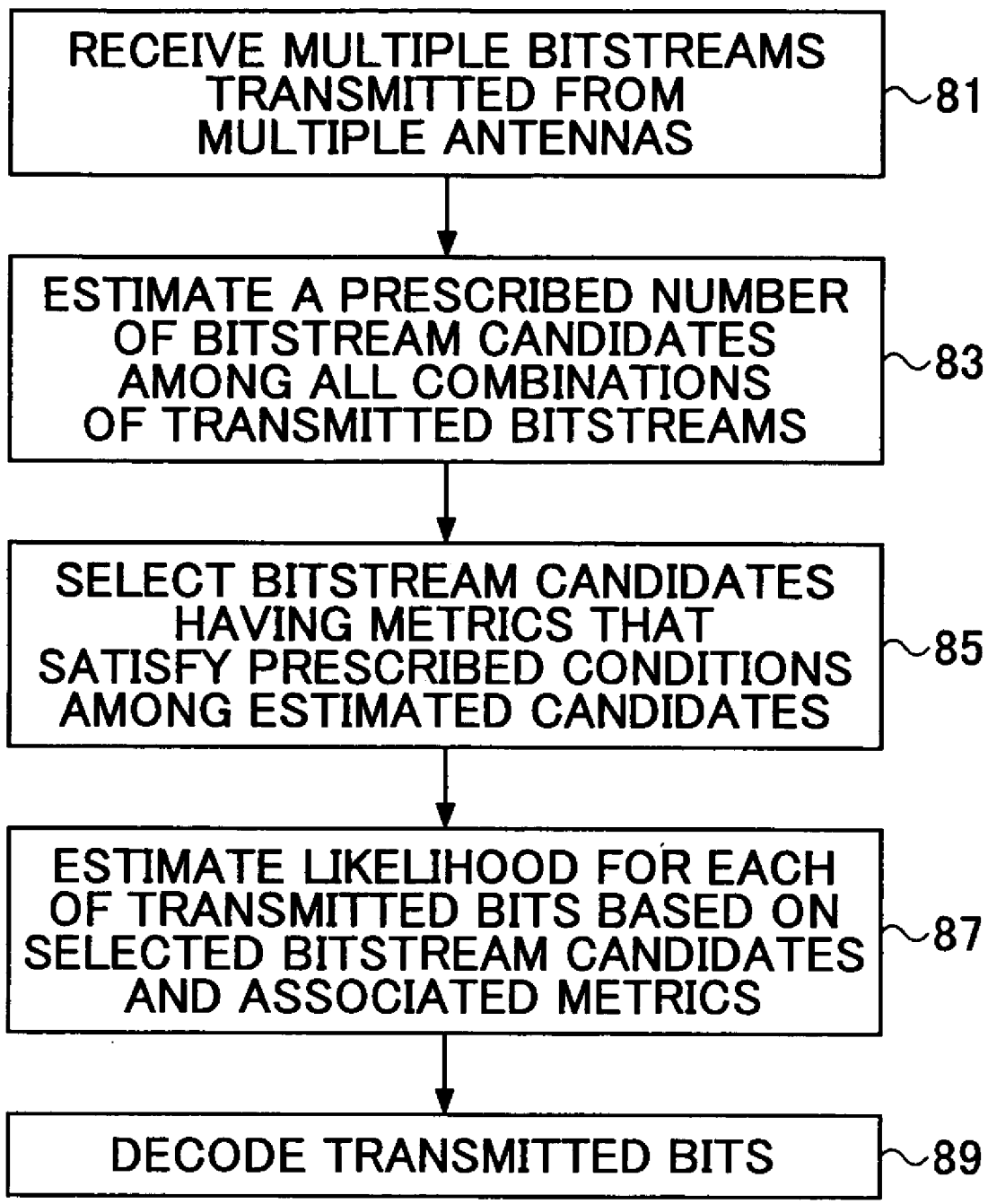
FIG. 8 is a flowchart showing a received signal processing method according to an embodiment of the invention.

FIG. 8 is a flowchart showing the received signal processing process described above. The process starts in step 81, where multiple bitstreams transmitted from multiple transmission antennas are received at multiple receiving antennas 11-1 through 11-M.

In step 83, a prescribed number of bitstream candidates are estimated among all possible combinations of the received bitstreams, and reliability information (e.g., metric) is calculated for each of the estimated candidates. In this example, 256 possible patterns are narrowed down to four bitstream candidates by the reduced bitstream candidate estimator 12. The reduced number of bitstream candidates may be estimated using, for example, a conventional M algorithm.

In step 85, bitstream candidates having metrics (reliability information) satisfying a prescribed condition are selected from the reduced number of (4 in this example) bitstream candidates. An example of the prescribed condition is that the metric exceeds a threshold C (for example, C=−10).

In step 87, likelihood is calculated for each bit of the transmitted bitstream based on the selected bitstream candidates and the associated reliability information (e.g., metric). This step is performed mainly by the likelihood calculator 15.

In step 89, the transmitted bitstream is decoded by the soft-input decoder 20, using the calculated likelihood estimates. Thus, the operation flow for estimation of likely symbols is terminated.

Figure 6A:
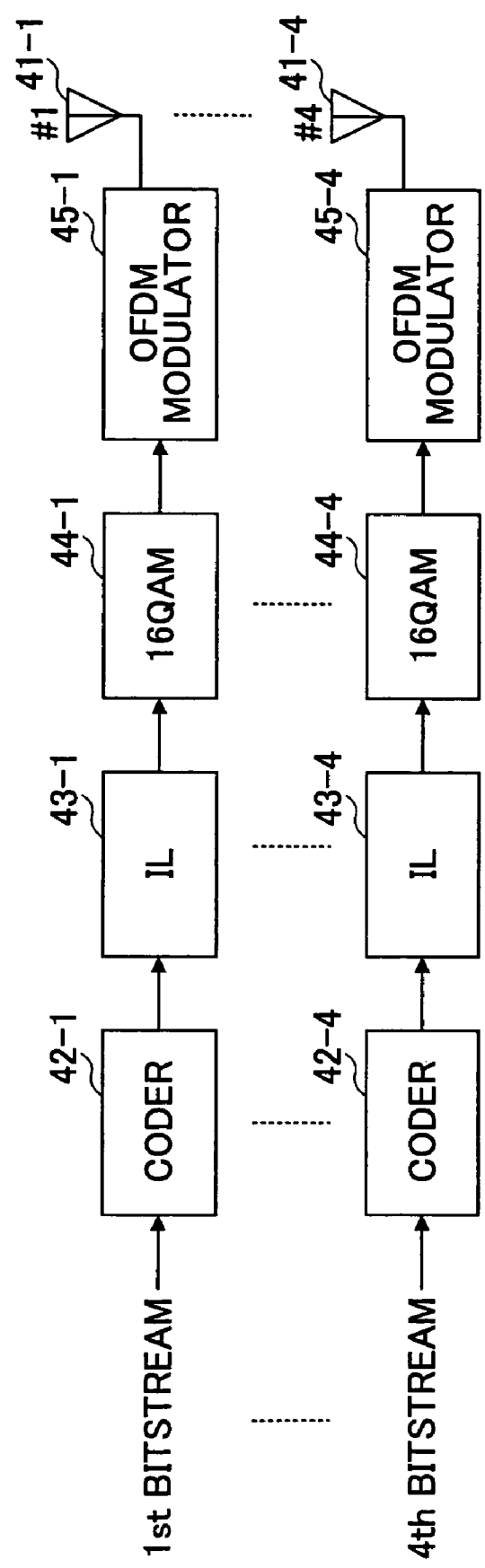

FIG. 6A and FIG. 6B illustrate applications of the receiver structure of the invention to OFDM modulation according to the second embodiment of the invention. FIG. 6A is a block diagram of a transmitting end, and FIG. 6B is a block diagram of a receiving end. In the example shown in FIG. 6A, four transmission antennas 41-1 through 41-4 are used, and encoding, interleaving, 16 QAM symbol mapping, and OFDM modulation are performed by the associated coders 42-1 through 42-4, interleavers 43-1 through 43-4, mappers 44-1 though 44-4, and OFDM modulators 45-1 through 45-4, respectively.

At the receiving end, the signals are received at receiving antennas 11-1 through 11-M, and subjected to OFDM demodulation at OFDM demodulators 31-1 through 31-M. After the OFDM demodulation, a certain number of bitstream candidates reduced to a certain extent (for example, 8 patterns) are estimated, and associated metrics are calculated in one of reduced bitstream candidate estimators 32 for each of the carriers. For application to the OFDM scheme, the bitstream candidates corresponding to all the combinations of the signal constellations are narrowed to a certain extent by each of the first through P-th carriers. The reduced number of bitstream candidates and the associated metrics are supplied to the bit-based likelihood estimator 33. Similar to the example shown in FIG. 4, the metric selector 34 selects those bitstream candidates having metrics over threshold C, and the likelihood calculator 34 calculates likelihood values for each bit based on the metrics of the selected bitstream candidates. The likelihood values calculated for the respective carriers are subjected to parallel-to-serial conversion at P/S converters 36-1 through 36-4, and deinterleaved at deinterleavers 37-1 through 37-4. Then, bitstreams transmitted from the transmission antennas 41-1 through 41-4 are decoded by soft-input decoders 38-1 through 38-4.

In either structure shown in FIG. 4, 5, or 6, the decoding result may be fed back to the reduced bitsream candidate estimator to repeat decoding.

Figure 7:
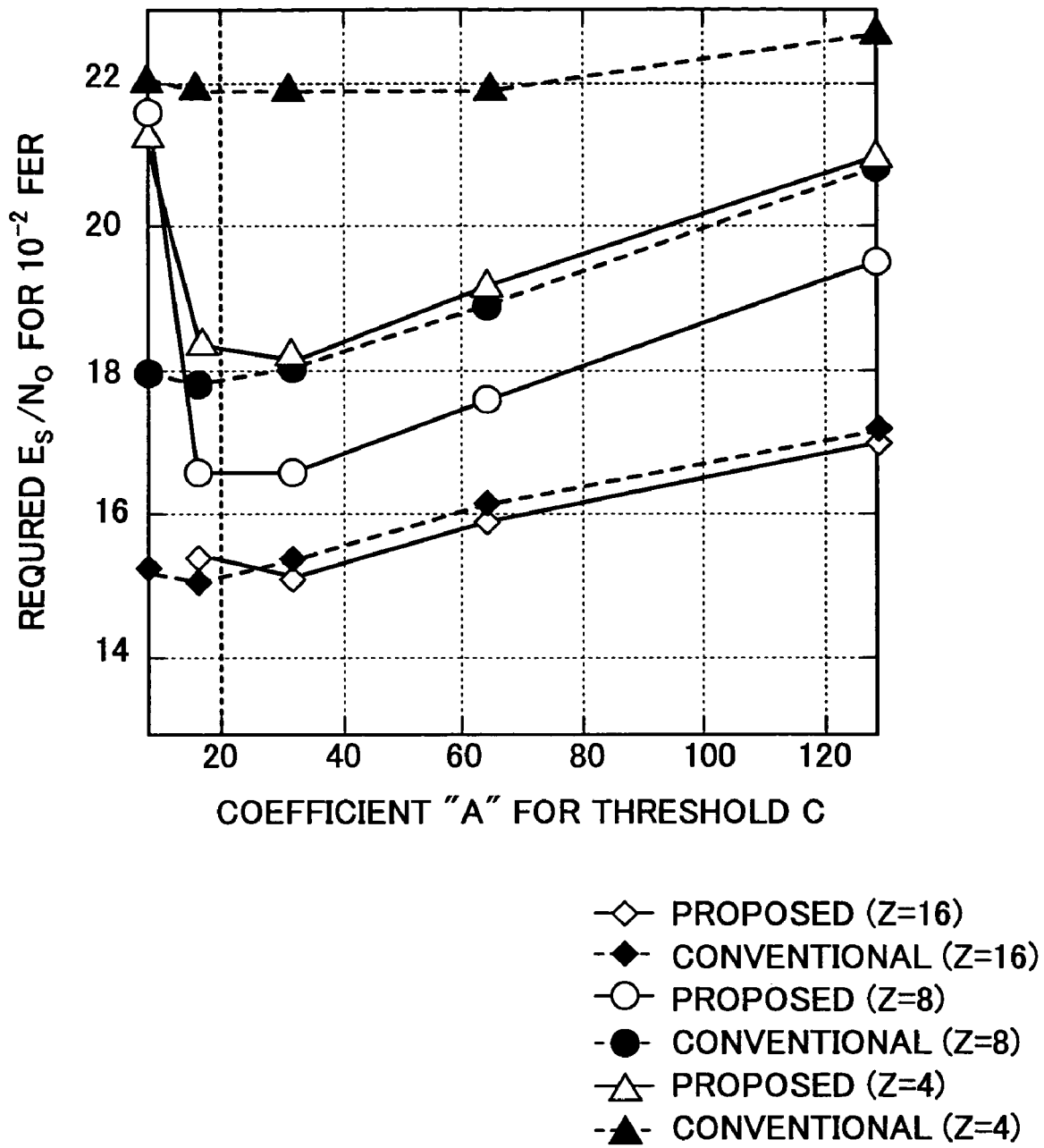
FIG. 7 is a graph showing advantages of the present invention as compared with a conventional reduced bitstream candidate based receiver.

FIG. 7 is a graph showing the assessment result of a computer simulation using the reduced bitstream candidate based receiver shown in FIG. 6B. In the simulation, 150-carrier OFDM modulation is performed, and turbo-code with constraint length of 4 is used. The structure disclosed in the above-described Publication (2) is employed as the reduced bitstream candidate estimator to reduce the number of bitstream candidates using M algorithm. The number Z of the narrowed candidates is varied among 4, 8, and 16.

In the graph, the vertical axis represents the ratio of average symbol received power level to noise level (Es/No) required to achieve 1% frame error rate (FER), and the horizontal axis represents the coefficient A defining the threshold C. The white diamonds indicate the characteristics of a reduced bitstream candidate based receiver of the present invention when Z is set to 16 (Z=16). The dark diamonds indicate the characteristics of a conventional reduced bitstream candidate based receiver when Z is set to 16 (Z=16). The white circles and the dark circles indicate the characteristics of the reduced bitstream candidate based receiver of the present invention and the conventional one, respectively, when Z is set to 8 (Z=8) The dark circles. The white triangles and the dark triangles indicate the reduced bitstream candidate based receiver of the present invention and the conventional one, respectively, when Z is set to 4 (Z=4).

In the reduced bitstream candidate based receiver of the invention, the threshold C used for metric selection is one defined by Equation (3), that is, $C=-A\sigma^2$, where coefficient A is varied among 8, 16, 32, 64, and 128. When there is no metric existing for a bit corresponding to "1" or "0" in the likelihood calculation, the threshold C is used as a substitute. On the other hand, in the conventional reduced bitstream candidate based receiver, X=−1000 is inserted when there is no metric existing for bit "1" or bit "0", and clipping coefficient C is defined as $C=-A\sigma^2$ as in the present invention. The A value is also varied among 8, 16, 32, 64, and 128.

The entirety of graph shown in FIG. 7 exhibits the superiority of the reduced bitstream candidate based receiver of the present invention. Especially, when Z=4 (that is, when the number of bit patterns are reduced to 4), the necessary Es/No ratio required to achieve 1% FER (FER=1%) is improved by about 4 dB by setting the coefficient A for threshold C between 16 and 32. As the number of bitstream candidates to be removed increases, the greater is the effect achieved by the reduced bitstream candidate based receiver of the present invention. However, as the number of finally selected bitstream candidates increases, the reliability of likelihood rises, and the required Es/No ratio is also is improved. Accordingly, the Z value is determined taking both computational workload and reliability into account. With the same Z value, the advantage of the reduced bitstream candidate based receiver of the present invention become conspicuous, as compared with the conventional one, when Z=4 and Z=8.

Figure 9:
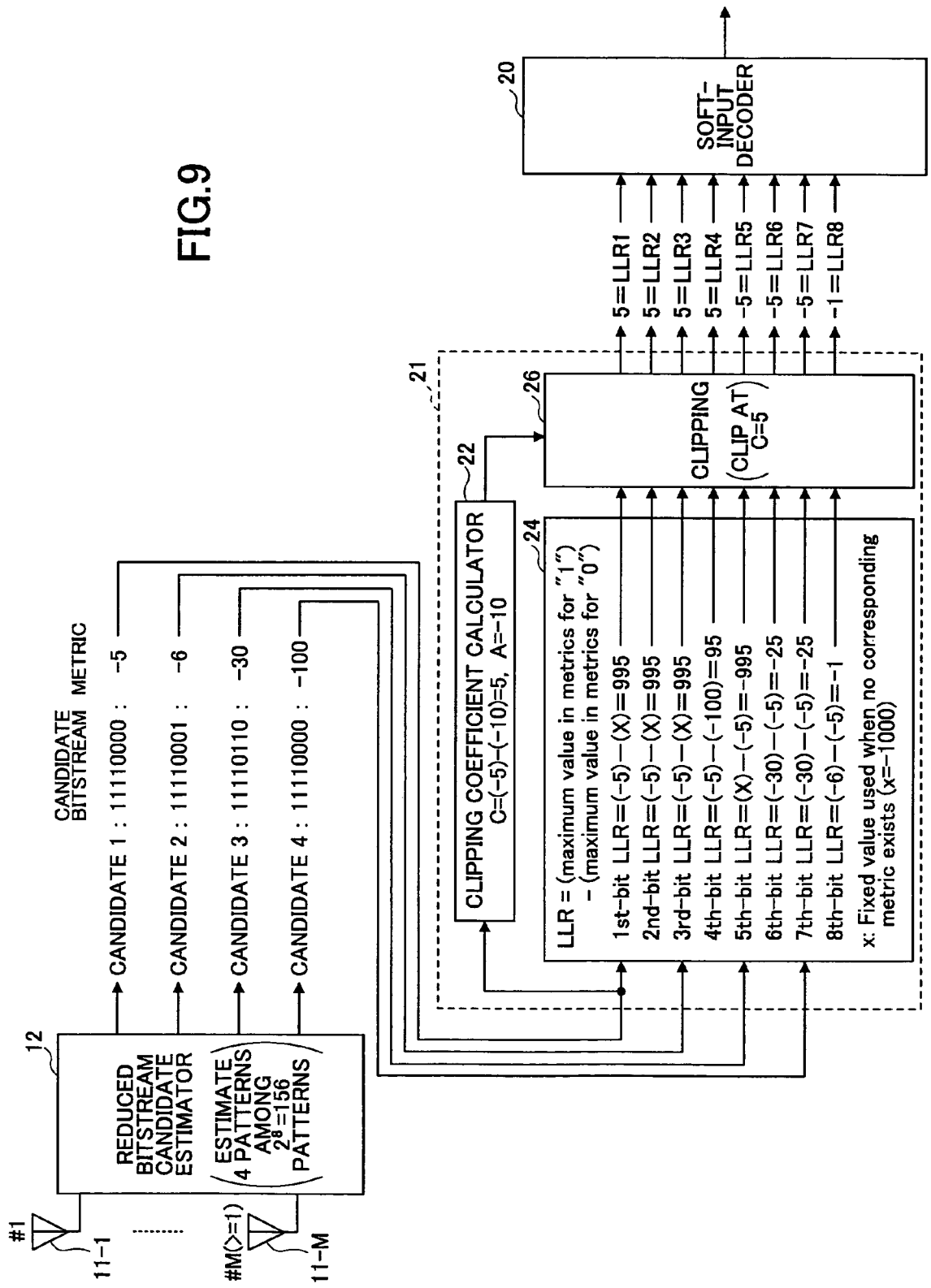
FIG. 9 is a schematic diagram illustrating still another example of bit-based likelihood estimation performed in a reduced bitstream candidate based receiver according to an embodiment of the invention.

FIG. 9 is a schematic block diagram of a receiver according to the third embodiment of the invention. In this example, an 8-bit code sequence is to be decoded. M receiving antennas 11-1 through 11-M receive signals. A reduced bitstream candidate estimator 12 estimates four (4) patterns among 256 (which equals $2^8$) bit patterns, and determines metric (expressed as $-\|r-H \cdot s\|^2$) for each of the estimated candidates. The metrics of the candidates 1, 2, 3 and 4 are −5, −6, −30 and −100, respectively. At this stage, the number of bitstream candidates is narrowed to 1/64. The reduction of the bitstream candidates may be performed using, for example, M algorithm (deterministic algorithm).

The bit-based likelihood estimator 21 includes a likelihood calculator 24, a likelihood clipping unit 26, and a clipping coefficient calculation unit 22. The likelihood calculator 24 calculates likelihood, to be more precise, log likelihood ratio (LLR), bit by bit using the four bitstream candidates 1-4 and the associated metrics.

The likelihood clipping unit 26 clips the likelihood at a prescribed threshold so as to round the likelihood whose absolute value (that is, the absolute value of the amplitude) exceeds the threshold down to the threshold. For example, the clipping value C is set to 30 (C=30) in advance, and those likelihood values over C are clipped to 30. The set of clipped likelihood values is supplied to the soft-input decoder 20, and the transmitted bitstream is decoded. The value estimated as likelihood (amplitude) reflects the certainty of the corresponding bit. For example, when comparing between likelihood 1000 and likelihood 10 of a bit determined as "+1", the former is more likely than the latter. However, the estimated likelihood value 1000 may be incorrect. Excessively high likelihood will greatly degrade the estimation accuracy if it is incorrect. By restricting such a high likelihood to a certain value, the reliability can be maintained stably.

Figure 3:
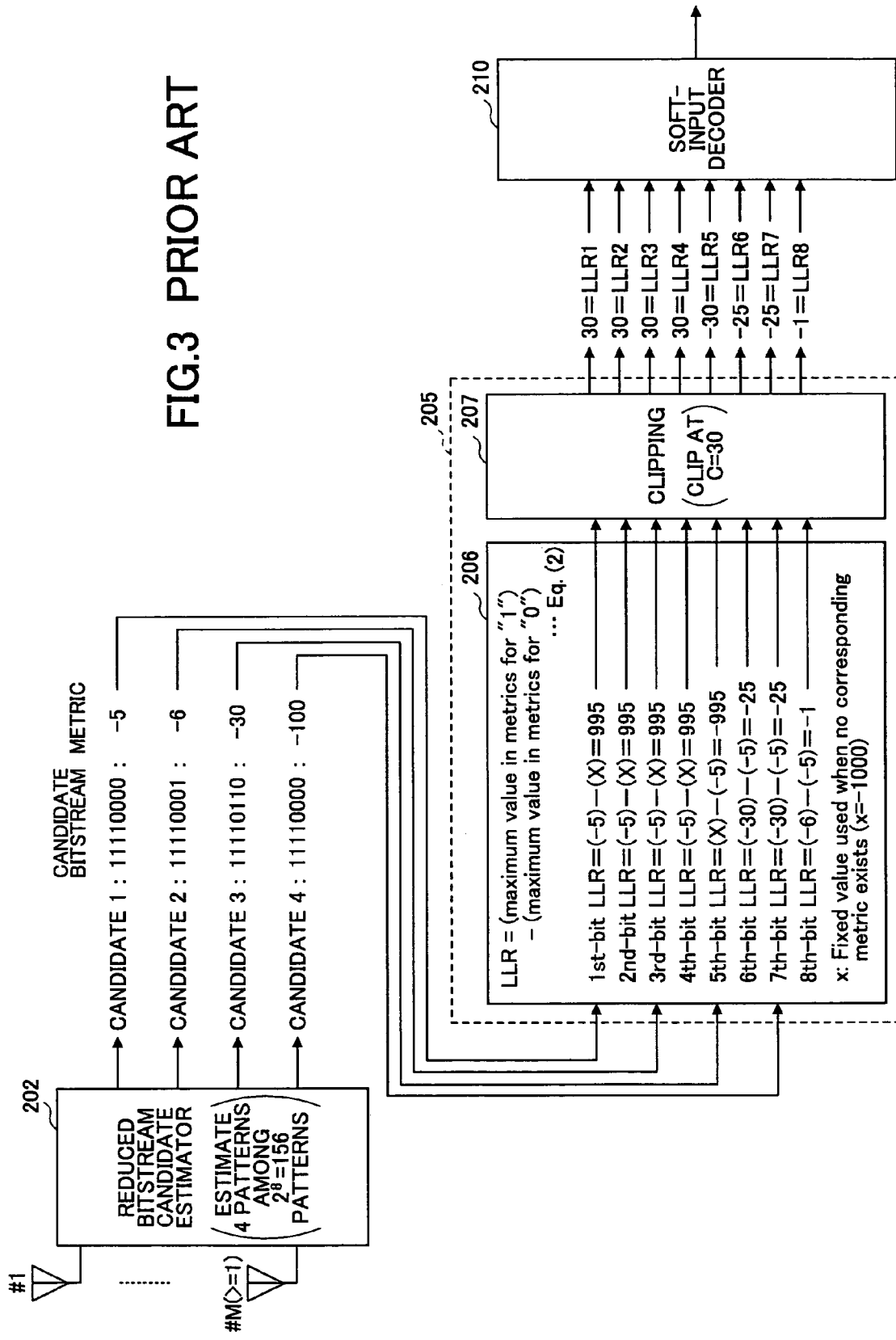
FIG. 3 illustrates an example of bit-based likelihood estimation carried out in the conventional reduced bitstream candidate based receiver.

The clipping coefficient calculation unit 22 updates the threshold C. In general, a transmission frame consists of multiple symbols, and decoding is performed at a receiving end frame by frame. In this case, the bitstream candidates are output per symbol, and the reduced bitstream candidate estimator 12 narrows the candidates every symbol. In the conventional receiver illustrated in FIG. 3, the threshold C is fixed. However, the signal level and the noise level may vary symbol by symbol because the channel condition and noise level can change symbol by symbol, and thus the fixed value may not be appropriate for some symbols. It is a concern that estimation accuracy and reliability of the bitstream candidate may be lowered depending on the wireless communication environment. In contrast, in this embodiment, the threshold C is variable so as to set the clipping level appropriately, and as a result, reliability is improved. In the embodiment, the threshold (clipping value) is set smaller when the reliability of bitstream candidates is low. If the same likelihood is continuously used when the reliability becomes low, unreliable likelihood values are input to the decoder, and the decoding accuracy may be degraded. By setting the threshold small, likelihood is restricted to a small range so as prevent less reliable likelihood values from being reflected in the decoding result. On the other hand, when the reliability of bitstream candidates is high, the threshold is set large. It is desired for reliable likelihood values to be input to the decoder. Accordingly, the threshold is raised so as to reflect reliable likelihood values in the decoding result with little confinement.

In an example, the threshold C is easily set, for example, in the following manner.

$$C = Me - A \text{ (if } Me - A > 0\text{), and}$$

$$C = 0 \text{ (if } Me - A \leq 0\text{)} \quad (4)$$

where Me is the maximum metric among the metrics of the estimated bitstream candidates, and A is a prescribed value. A is selected so as to be proportional to variance $\sigma^2$ of noise in the propagation environment ($A = -B\sigma^2$), where B is a constant. With this arrangement, when the reliability of the bitstream candidates is high, the threshold C is increased in proportion to the maximum metric, while the threshold C is set to zero if the maximum metric is at or below the prescribed value A with low reliability.

Figure 10:
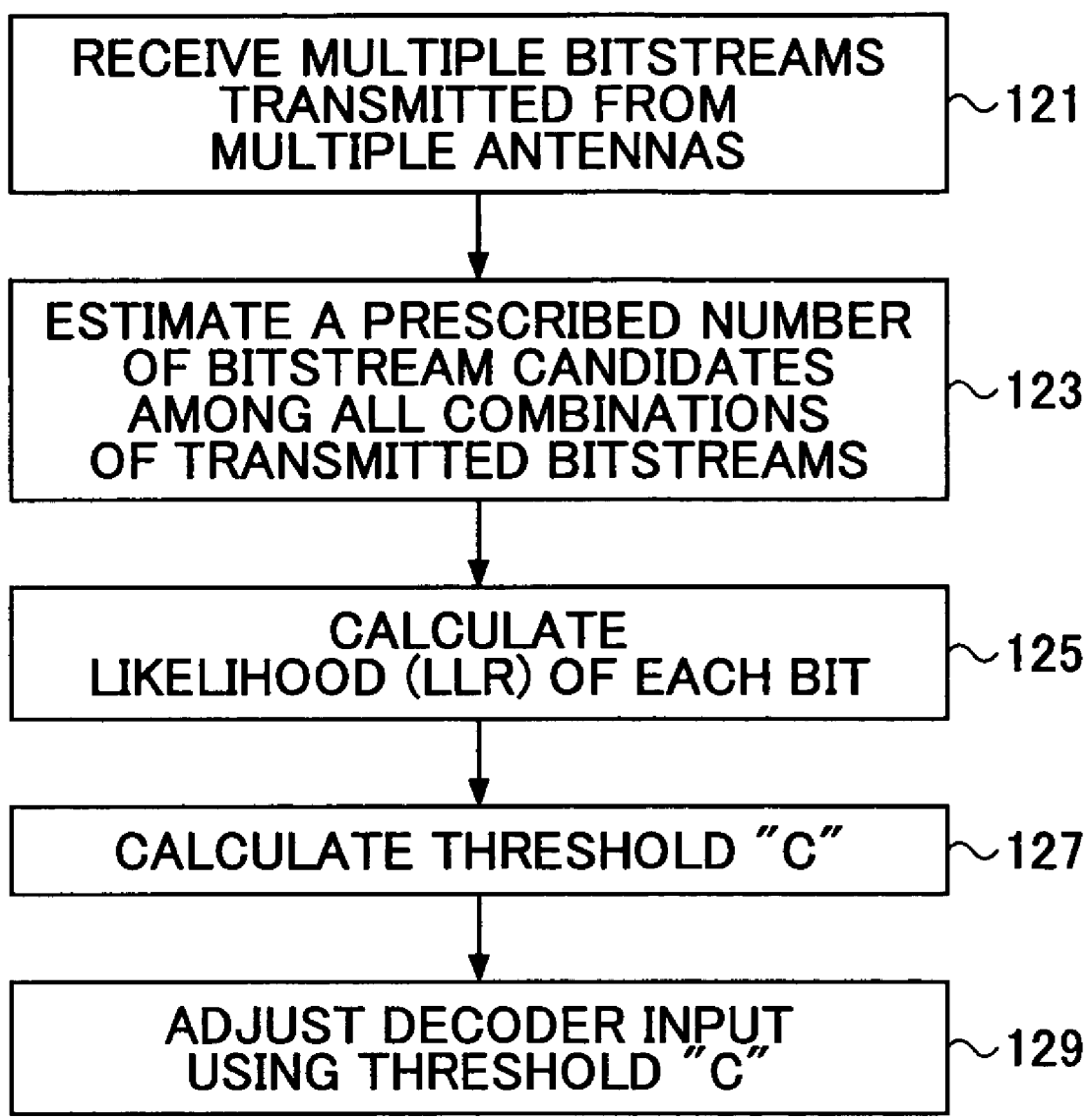
FIG. 10 is a flowchart showing a received signal processing method according to another embodiment of the invention.

FIG. 10 is a flowchart of the received signal processing method according to an embodiment of the invention. The process starts in step 121, where multiple bitstreams transmitted from multiple transmission antennas are received at multiple receiving antennas 11-1 through 11-M.

In step 123, a prescribed number of bitstream candidates are estimated among all the possible combinations of the received bitstreams, and reliability information is calculated for each of the estimated candidates. A metric representing the reliable information of each bitstream candidate is calculated using $-\|r - H \cdot s\|^2$. In the example shown in FIG. 9, metrics of the candidates 1, 2, 3 and 4 are −5, −6, −30 and −100, respectively.

In step 125, the likelihood LLR is calculated for each of the bits defining the transmitted bitstream using Equation (2). For the first bit, all of the four candidates take a value "1", and the first term of the right-hand-side of LLR expressed by Equation (2), which is the maximum metric of a bit corresponding to "1", becomes −5. The second term of the right-hand-side of Equation (2), which is the maximum metric of a bit corresponding to "0", is undetermined because there is no candidate having "0" at the first bit. In this case, a prescribed fixed value is inserted in place of the metric of the bitstream candidates. In FIG. 9, fixed value X is set to −1000 (X=−1000). Consequently, the LLR of the first bit becomes −5−(−1000) =995. Similarly, likelihood is calculated for each of the second through the eighth bits, which comes out 995, 995, 995, 95, −995, −25, −25, and −1, respectively.

In step 127, a threshold C is determined based on the maximum metric Me. In this example, candidate 1 has the maximum metric −5, and a prescribed value A is −10 (A=−10). Since calculated C is positive (−1−(−10)=5>0), threshold C is determined as C=5. This step is carried out mainly by the clipping coefficient calculation unit 22.

In step 129, the input to the decoder 20 is adjusted based on the threshold C. To be more precise, unless the absolute value of the likelihood of each bit exceeds C=5 (as long as likelihood resides within the range between −5 and +5), calculated likelihood is output as it is. If the absolute value of likelihood exceeds threshold C, then it is confined at threshold C. As a result, the first through the eighth bits to be input to the decoder 20 become 5, 5, 5, 5, −5, −5, −5, and −1. Then, the soft-input decoder 20 decodes the transmitted bitstream using the likelihood values of the input bits.

In the flow shown in FIG. 10, step 127 is carried out after step 125 for convenience sake of explanation; however, the order may be reversed, or alternatively, a part or all of the process of these two steps may be performed simultaneously, as long as the threshold C and the likelihood of each bit are obtained at the end of step 129.

Figure 11:
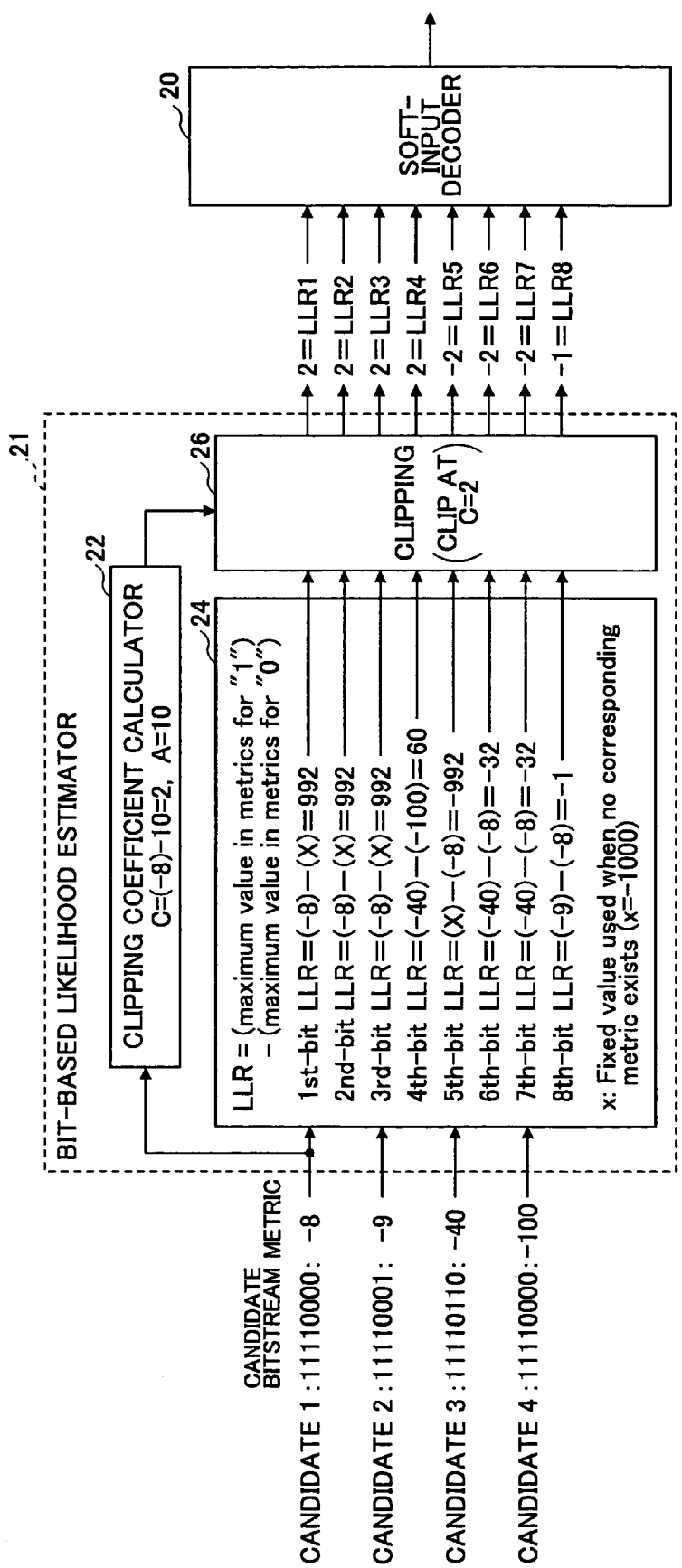
FIG. 11 is a schematic diagram illustrating yet another example of bit-based likelihood estimation performed in a reduced bitstream candidate based receiver according to an embodiment of the invention.
Figure 12:
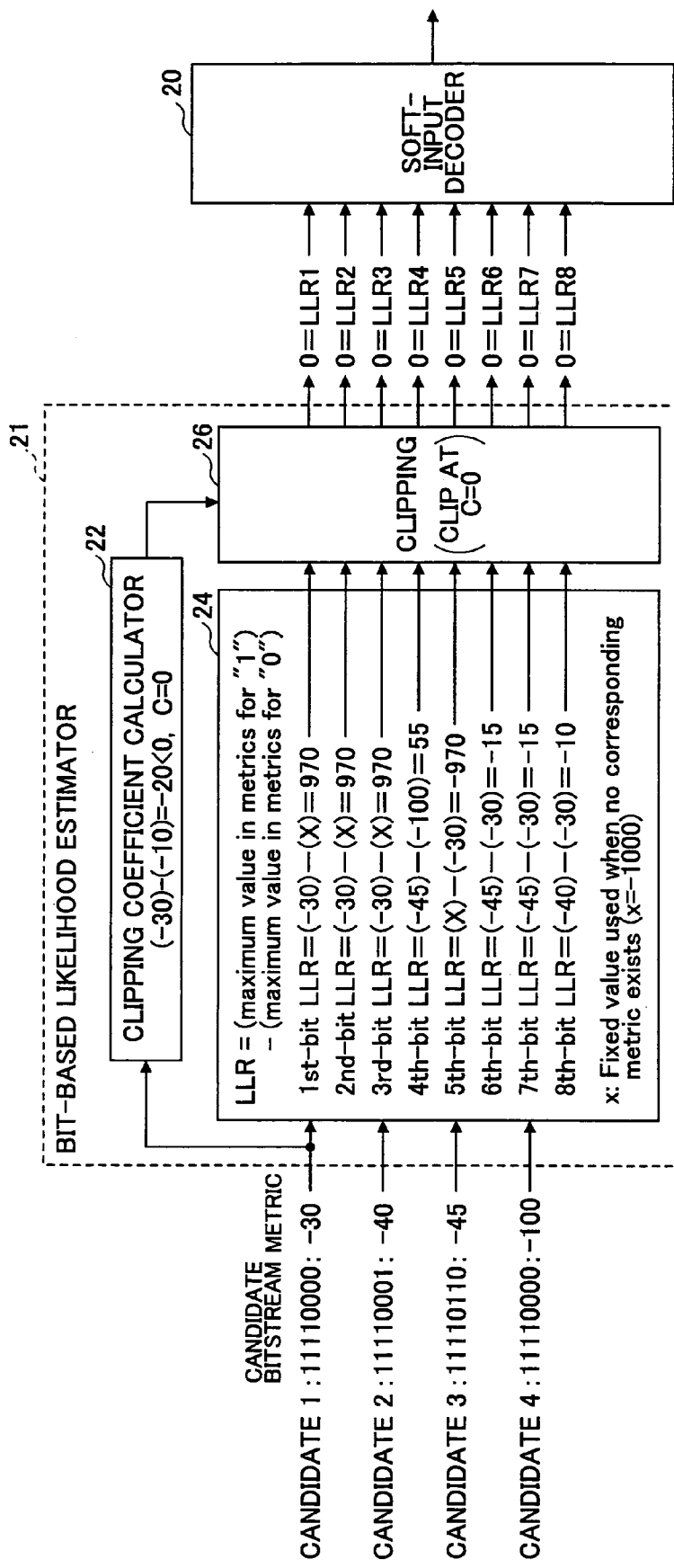
FIG. 12 is a schematic diagram illustrating yet another example of bit-based likelihood estimation according to an embodiment of the invention.

Bitstream candidates are acquired for each symbol. In this embodiment, the threshold C is updated every symbol, and the likelihood determined bit by bit is clipped at the appropriately updated threshold. The example shown in FIG. 11 illustrates bit-based likelihood estimation when the maximum metric is −8 (candidate 1). In this case, threshold C is calculated as in step 127, which comes out −8−(−10)=2>0. In the example shown in FIG. 12, the maximum metric is −30 of candidate 1, and the threshold 0 is set to zero (−30−(−10) =20<0). This means that the reliability of likelihood is low.

By the way, in the first embodiment shown in FIG. 4, the reduced number of bitstream candidates is further narrowed by threshold C so as to select only those metrics over the threshold. If there are no appropriate metrics for bit-based LLR calculation, a fixed value X is inserted instead of the metric. For example, for the first bit, neither candidate 1 nor candidate 2 has a metric for bit "0" because the first bits of both candidates are "1". Then, the fixed value x=−10 is substituted for the maximum metric for bit "0", and the first-bit LLR becomes −5−(−10)=5. On the other hand, in the third embodiment shown in FIG. 9 through FIG. 12, excessively large metrics are clipped by the threshold C, and the threshold C is set to C=Me−A in one example, where Me is the maximum metric and A is a fixed value. Accordingly, if the threshold C, the fixed value x and the coefficient A are the same between the two embodiments, the resultant estimations become equivalent, although the computational workload is less in the first embodiment. If simulation is performed for the third embodiment under the same conditions as the first embodiment, and if $$x = C \text{ (of the first embodiment)}$$
$$= A \text{ (of the third embodiment in Eq. (4))}$$

holds, then, the same result as that shown in FIG. 7 will be obtained.

Figure 13:
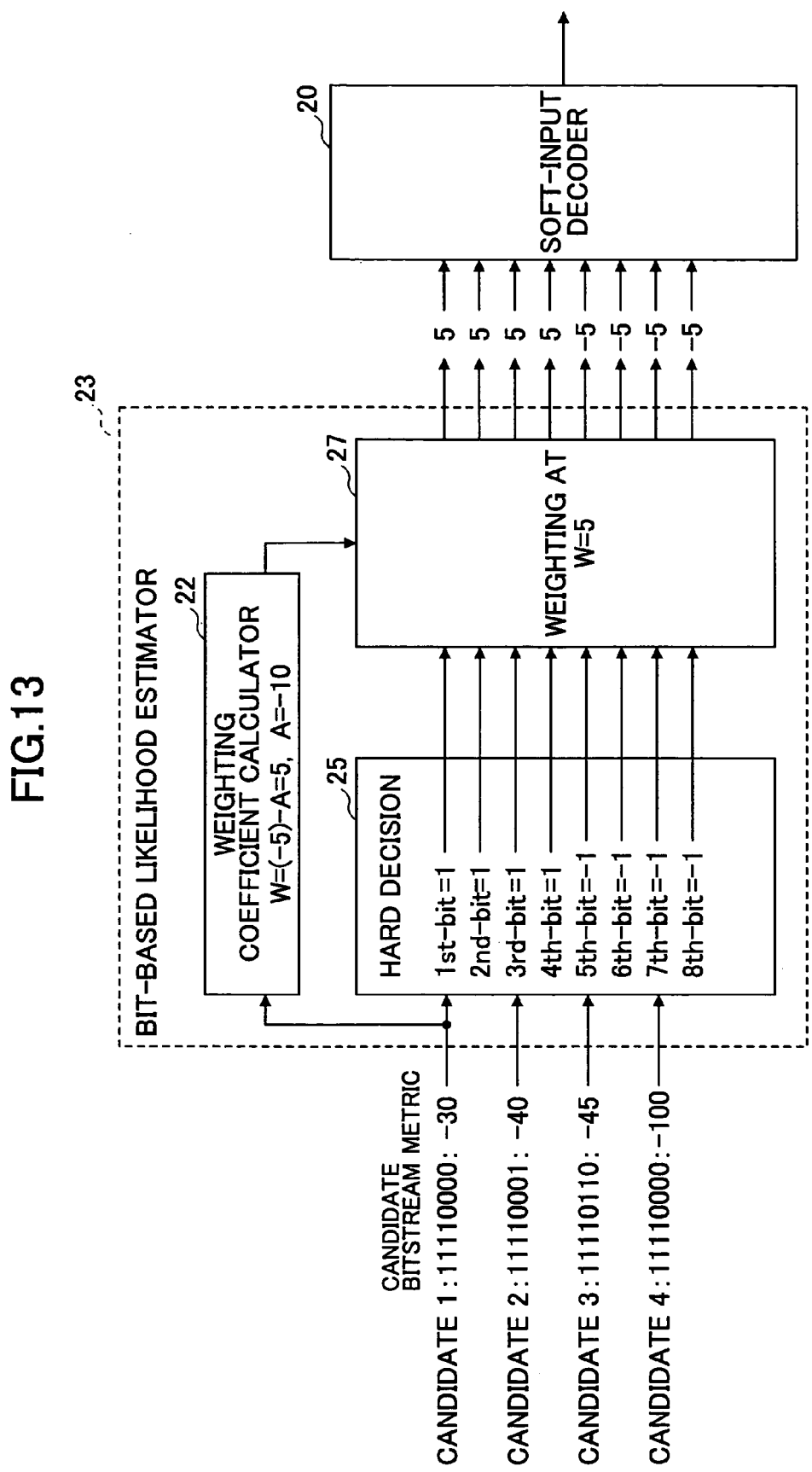
FIG. 13 is a schematic block diagram illustrating a modification of the bit-based likelihood estimator.

FIG. 13 is a schematic block diagram of bit-based likelihood estimator 23 according to the fourth embodiment of the invention. This likelihood estimator may be used in place of that used in the first through the third embodiments. The bit-based likelihood estimator 23 includes a hard-decision unit 25, a weighting unit 27, and a weighting coefficient calculation unit 22. The hard-decision unit 25 carries out hard decision on the current symbol bit by bit, using the bitstream candidate having the maximum metric. The weighting unit 27 multiples the output of the hard decision by a weighting coefficient, and the product is supplied to the soft-input decoder 20. The weighting coefficient calculation unit 22 outputs the weighting coefficient to the weighting unit 27.

Figure 14:
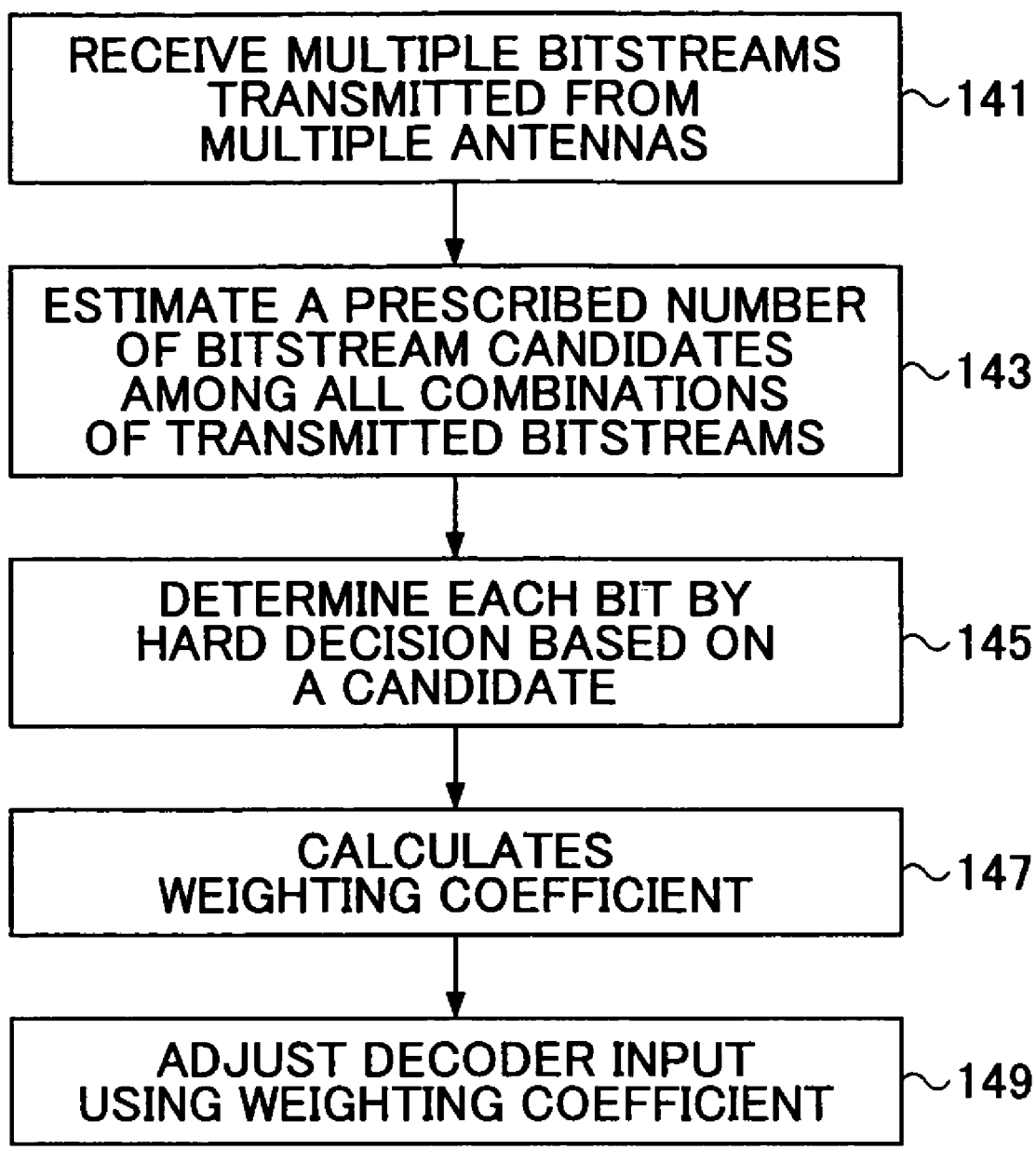
FIG. 14 is a flowchart showing a received signal processing method according to an embodiment of the invention.

FIG. 14 is a flowchart showing the operation according to the fourth embodiment. The process starts in step 141, where multiple bitstreams transmitted from multiple transmission antennas are received at receiving antennas 11-1 through 11-M.

In step 143, a prescribed number of bitstream candidates are estimated among all the combinations of the received bitstreams, and reliability information is calculated for each of the candidates. The reliability information is represented as a metric, which is determined based on $-\|r-H\cdot s\|^2$. In this example, the metrics of candidates 1, 2, 3 and 4 are −30, −40, −45 and −100, respectively.

In step 145, hard decision is carried out based on the bits defining the bitstream with the maximum metric. In this example, the bitstream candidate having the maximum metric of −30 is "1111000", and the hard decision for the first bit becomes +1. Hard decision is also carried out for the second and the subsequent bits in a similar manner, and the set of hard decisions "1, 1, 1, 1, −1, −1, −1, −1" are obtained. This hard decision result is supplied to the weighting unit 27. This hard-decision result is a temporary result, which becomes the basis of the actual hard-decision result used in the decoding process in soft-input decoder 20.

In step 147, a weighting coefficient W is calculated. The weighting coefficient may be determined in the same manner as in the third embodiment, such that $$W=Me-A (Me-A>0),$$

and $$W=0 \text{ (if } Me-A\leq 0).$$

In step 147, the temporary hard-decision result is multiplied by the weighting coefficient. By setting the weighting coefficient, the hard-decision result can be weighted according to the level of reliability. If the reliability is high, the hard-decision result is weighted so as to increase, while with a low reliability the hard-decision result is adjusted to a smaller value.

As has been described above, likelihood is estimated using metrics of only reliable bit patterns (candidates) in the reduced bitstream candidate based receiver of the present invention. Consequently, a satisfactory signal-receiving characteristic can be maintained, while reducing the computational amount of received signal processing.

In the embodiments, metric selector 14, a combination of clipping coefficient calculation unit 22 and clipping unit 26, and a combination of weighting coefficient calculation unit 22 and weighting unit 27 serve as an adjustor used to adjust the likelihood to be input to the decoder.

In the first and second embodiments, a reduced number of bitsream candidates are further narrowed so as to select only reliable candidates. Accordingly, the accuracy of likelihood estimation is improved.

In the third and fourth embodiments, bit-based estimation results are adjusted using a threshold. The threshold can be set or updated depending on the propagation channel, the modulation scheme of the transmitted signal, or other system parameters (such as the number of symbol candidates output from the reduced bitstream candidate estimator). Consequently, the estimation accuracy of the transmitted signal is improved. Such a threshold may be updated several times within a frame period including multiple symbols, or alternatively, updated every symbol period.

In the third embodiment, likelihood (which is a soft-decision result of each bit of a transmitted stream) is adjusted by clipping the likelihood value using a threshold in order to confine excessively large likelihood values.

In the fourth embodiment, the transmitted bitstream is estimated by hard decisions made for each bit of the bitstream, and is weighted by a threshold. Accordingly, the temporary hard-decision result is adjusted according to the metrics of the candidates reflected in the threshold.

In the embodiments, the threshold is raised when the reliability of the transmitted bitstream candidate is high. The higher the reliability (that is, the more likely the bit value), the greater the absolute value of the likelihood estimate is set; otherwise, the estimated likelihood to be output is made smaller so as to improve the estimation accuracy.

For example, when it is determined that the reliability of the estimated bitstream candidate is low, the threshold is set to a fixed value (e.g., zero), thereby preventing unreliable candidates from being used in estimation.

In another example, the threshold is determined based on the most reliable bit information (with the maximum metric). This arrangement can reduce the computational workload.

The threshold C may be defined using the maximum reliability Me and a prescribed value A. If the maximum reliability Me is greater than A, the threshold C is set to the difference between Me and A. If Me is less than or equal to A, then the threshold is set to zero. Thus, the threshold is adjusted easily and appropriately depending on the reliability level.

The prescribed value A may be proportional to variance of noise introduced in the signal in the wireless channel. Since the variance of noise can be appropriately determined at the receiving end, the threshold can be set correctly without using external information.

The structure of the present invention may be applied to an interference canceling technique at a receiving end (mobile terminal) under the situation where multiple systems coexist.

This patent application is based on and claims the benefit of the earlier filing dates of Japanese Patent Application No. 2004-190014 filed Jun. 28, 2004 and No. 2005-026403 filed Feb. 2, 2005, the entire contents of which are hereby incorporated by reference.

What is claimed is:

1. A receiver comprising:
   one or more receiving antennas configured to receive a plurality of bitstreams transmitted from one or more transmission antennas;
   a bitstream candidate estimator configured to estimate a prescribed number of bitstream candidates among possible combinations of the received bitstreams and to calculate reliability information for each of the candidates;
   a bit-based estimator configured to produce a bit-based estimation result for each bit of the transmitted bitstreams based on the estimated candidates and the associated reliability information, the bit-based estimation result being adjusted by an adjusting criterion determined by the reliability information; and
   a decoder configured to decode the transmitted bitstreams based on the adjusted bit-based estimation result.

2. The receiver of claim 1, wherein the bit-based estimator adjusts the bit-based estimation result by selecting one or more candidates with reliability information levels satisfying the adjusting criterion from the estimated candidates prior to the bit-based estimation, or by confining the bit-based estimation result to a certain level using the adjusting criterion.

3. The receiver of claim 1, wherein the bit-based estimator includes:
   a selector configured to select one or more candidates having reliability information levels satisfying the adjusting criterion from the estimated bitstream candidates; and a likelihood calculator configured to calculate likelihood of each bit of the transmitted bitstream based on the selected candidates and the associated reliability information.

4. The receiver of claim 3, wherein the selector selects said one or more candidates having reliability information levels over a threshold defined by the adjusting criterion.

5. The receiver of claim 4, wherein the threshold is determined by a variance of noise introduced in signals during propagation criterion.

6. The receiver of claim 4, wherein the likelihood calculator uses the thresholds when calculating the likelihood of the bit based on the selected candidates.

7. The receiver of claim 3, wherein if a situation in which the likelihood calculation results of all the bits are zero continues for a prescribed time, then the selector selects an arbitrary candidate from the estimated bitstream candidates, and the likelihood calculator calculates the likelihood of each bit based on the arbitrarily selected candidate.

8. The receiver of claim 1, wherein the bit-based estimator includes:
an adjusting factor calculation unit configured to determine and update a threshold as the adjusting criterion based on the reliability information; and
an adjustor configured to adjust the bit-based estimation result using the adjusting criterion.

9. The receiver of claim 8, wherein the threshold is updated a plurality of times during a frame period consisting of a plurality of symbols.

10. The receiver of claim 8, wherein the bit-based estimation result is produced by soft decision, and the adjustor confines the bit-based estimation result using the threshold.

11. The receiver of claim 8, wherein the bit-based estimation result is produced by hard decision, and the adjustor adjusts the bit-based estimation result using a weighting factor determined by the adjusting factor calculation unit.

12. The receiver of claim 8, wherein the threshold is set higher as a level of the reliability information of the estimated bitstream candidate is high.

13. The receiver of claim 8, wherein the threshold is set to a fixed value when it is determined that a level of the reliability information of the estimated bitstream candidate is low.

14. The receiver of claim 8, wherein the adjusting factor calculation unit determines the threshold based on a maximum level of the reliability information of the estimated bitstream candidate.

15. The receiver of claim 14, wherein if the maximum level of the reliability information is greater than a prescribed level, the threshold is set to a difference between the maximum level and the prescribed level, and if the maximum level is less than or equal to the prescribed level, then the threshold is set to zero.

16. The receiver of claim 15, wherein the prescribed level is proportional to a variance of noise introduced in a signal in a propagation channel.

17. A signal processing method comprising the steps of:
receiving a plurality of bitstreams transmitted from one or more transmission antennas;
estimating a prescribed number of bitstream candidates among all possible combinations of the received bitstreams;
calculating reliability information for each of the estimated candidates;
producing a bit-based estimation result made for each bit of the transmitted streams from the estimated candidates and the reliability information, based on a prescribed adjusting criterion determined by the reliability information; and
decoding the transmitted bitstreams based on the adjusted bit-based estimation result.

18. The step of claim 17, further comprising the steps of:
selecting one or more candidates with a level of the reliability information exceeding the adjusting criterion from the estimated candidates;
wherein the bit-based estimation result is produced from the selected candidates and the associated reliability information.

19. The step of claim 17, further comprising the steps of:
determining a threshold as the adjusting criterion based on the reliability information;
wherein the bit-based estimation result is confined to a certain level by the threshold.

20. The step of claim 17, further comprising the steps of:
determining a weighing coefficient as the adjusting criterion based on the reliability information;
wherein the bit-based estimation result is adjusted using the weighting coefficient.

* * * * *